United States Patent
Takei

(10) Patent No.: US 9,884,517 B2
(45) Date of Patent: Feb. 6, 2018

(54) PNEUMATIC TIRE

(71) Applicant: BRIDGESTONE CORPORATION, Tokyo (JP)

(72) Inventor: Ataka Takei, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 108 days.

(21) Appl. No.: 14/441,340

(22) PCT Filed: Oct. 18, 2013

(86) PCT No.: PCT/JP2013/006188
§ 371 (c)(1),
(2) Date: May 7, 2015

(87) PCT Pub. No.: WO2014/087569
PCT Pub. Date: Jun. 12, 2014

(65) Prior Publication Data
US 2015/0266345 A1 Sep. 24, 2015

(30) Foreign Application Priority Data

Dec. 7, 2012 (JP) .................................. 2012-268478

(51) Int. Cl.
*B60C 11/03* (2006.01)
*B60C 11/12* (2006.01)

(52) U.S. Cl.
CPC ...... *B60C 11/0304* (2013.01); *B60C 11/0302* (2013.01); *B60C 11/0306* (2013.01);
(Continued)

(58) Field of Classification Search
CPC .................... B60C 11/0302; B60C 2011/0351
See application file for complete search history.

(56) References Cited

U.S. PATENT DOCUMENTS 4,057,089 A * 11/1977 Johannsen .......... B60C 11/0302
152/209.18
4,456,046 A * 6/1984 Miller ................. B60C 11/0302
152/209.18
(Continued)

FOREIGN PATENT DOCUMENTS

CN 1733511 A 2/2006
CN 101678722 A 3/2010
(Continued)

OTHER PUBLICATIONS

Machine translation for German 3,424,796 (no date).*
(Continued)

*Primary Examiner* — Steven D Maki
(74) *Attorney, Agent, or Firm* — Sughrue Mion, PLLC

(57) ABSTRACT

A pneumatic tire, having in a tread surface thereof a pair of circumferential grooves formed on respective sides of the tire equatorial plane in the middle, a rib-like central land portion row demarcated by the circumferential grooves, and a plurality of lateral grooves extending between the central land portion row and each tread end, comprises in each half region of the tread: a row of first intermediate blocks each having a circumferential length D2 and demarcated by the lateral grooves, the corresponding circumferential groove, and first longitudinal grooves; and a row of second intermediate blocks demarcated by the lateral grooves, the first longitudinal grooves, and second longitudinal grooves, wherein facing openings of the first/second longitudinal grooves adjacent in the tire circumferential direction are offset from each other, and provided that D1 represents a circumferential distance between adjacent ends of the adjacent first and second intermediate blocks, $D1 \leq D2/2$.

7 Claims, 1 Drawing Sheet

(52) U.S. Cl.
CPC ............... *B60C 2011/0346* (2013.01); *B60C 2011/0351* (2013.01); *B60C 2011/0353* (2013.01); *B60C 2011/0358* (2013.01); *B60C 2011/0374* (2013.01); *B60C 2011/0388* (2013.01); *B60C 2011/1213* (2013.01); *B60C 2011/1227* (2013.01); *B60C 2011/1245* (2013.01)

(56) References Cited

U.S. PATENT DOCUMENTS

| | | | | |
|---|---|---|---|---|
| D316,842 S | * | 5/1991 | Graas | D12/551 |
| D663,258 S | * | 7/2012 | Takei | D12/552 |
| 2009/0283189 A1 | * | 11/2009 | Mun | B60C 11/12 152/209.18 |
| 2010/0132864 A1 | * | 6/2010 | Colombo | B60C 11/0302 152/209.8 |

FOREIGN PATENT DOCUMENTS

| | | | |
|---|---|---|---|
| DE | 3424796 A1 | * | 1/1985 |
| EP | 2835274 A1 | | 2/2015 |
| JP | 02-182505 A | * | 7/1990 |
| JP | 3132404 A | | 6/1991 |
| JP | 5330317 A | | 12/1993 |
| JP | 2000-238511 A | | 9/2000 |
| JP | 200372321 A | | 3/2003 |
| JP | 4397956 B1 | | 1/2010 |
| JP | 2010-23595 A | | 2/2010 |
| JP | 2012-76603 A | | 4/2012 |

OTHER PUBLICATIONS

Machine translation for Japan 02-182505 (no date).*
International Search Report of PCT/JP2013/006188 dated Dec. 3, 2013.

* cited by examiner

PNEUMATIC TIRE

CROSS REFERENCE TO RELATED APPLICATIONS

This application is a National Stage of International Application No. PCT/JP2013/006188 filed Oct. 18, 2013, claiming priority based on Japanese Patent Application No. 2012-268478, filed Dec. 7, 2012, the contents of all of which are incorporated herein by reference in their entirety.

TECHNICAL FIELD

The present invention relates to a pneumatic tire and in particular a pneumatic tire suitably used as a winter tire.

BACKGROUND ART

There has conventionally been proposed as a pneumatic tire for use on a snow-covered/frozen road a pneumatic tire having: a rib-like land portion situated on the tire equatorial plane; and three pairs of block land portion rows provided such that rows of block land portions of each pair are disposed on respective sides of the tire equatorial plane, wherein a large number of sipes are formed in the rib-like land portion and the block land portions (refer to PTL 1, for example).

CITATION LIST

Patent Literature

PTL 1: JP4397956

SUMMARY

In the pneumatic tire disclosed in PTL 1, however, timing for edge portions of a first block land portion to be released from a ground surface differs from timing for edge portions of a second block land portion to be released from the ground surface when the tire is rotated, although the first block land portion and the second block land portion are adjacent to each other in the tire width direction, because circumferential lengths of these two block land portions are significantly different from each other. Accordingly, the second block land portion is pulled by the first block land portion and tends to be deformed and thus fail to ensure a satisfactorily large ground contact area thereof in the pneumatic tire when the tire is rotated, which possibly deteriorates driving performance and/or braking performance and causes partial wear of the tire. Further, the pneumatic tire, in which the first block land portions have long circumferential lengths, can be provided with lateral grooves extending from the tire equatorial plane side to each tread end at only restricted positions, which results in unsatisfactory improvement in on-snow performance and drainage performance in running on a wet road surface, of the tire.

An object of the present disclosure is to provide a pneumatic tire capable of suppressing occurrence of partial wear and exhibiting good drainage performance, on-snow performance, driving performance, and braking performance.

Specifically, our pneumatic tire, having in a tread surface thereof a pair of circumferential grooves formed on respective sides of the tire equatorial plane in the middle, a rib-like central land portion row demarcated by the pair of the circumferential grooves, and a plurality of lateral grooves continuously extending in the tire width direction between the central land portion row and each tread end, comprises in each half region of the tread surface:

a first intermediate land portion row constituted of first intermediate blocks demarcated by the lateral grooves, the corresponding circumferential groove, and first longitudinal grooves each situated on the outer side in the tire width direction than the circumferential groove and extending in the tire circumferential direction between the corresponding lateral grooves adjacent to each other in the tire circumferential direction; and a second intermediate land portion row constituted of second intermediate blocks demarcated by the lateral grooves, the first longitudinal grooves, and second longitudinal grooves each situated on the outer side in the tire width direction than the first longitudinal grooves and extending in the tire circumferential direction between the corresponding lateral grooves adjacent to each other in the tire circumferential direction, wherein an opening, on one side in the tire circumferential direction, of one first longitudinal groove is shifted in the tire width direction from an opening, on the other side in the circumferential direction, of another first longitudinal groove situated on the one side in the tire circumferential direction of the one first longitudinal groove, an opening, on one side in the circumferential direction, of one second longitudinal groove is shifted in the tire width direction from an opening, on the other side in the circumferential direction, of another second longitudinal groove situated on the one side in the tire circumferential direction of the one second longitudinal groove, and provided that D1 represents a distance in the tire circumferential direction measured from an end, on the one side in the tire circumferential direction, of each first intermediate block to an end, on the one side in the tire circumferential direction, of the second intermediate block adjacent to the first intermediate block on the outer side in the tire width direction of the first intermediate block and D2 represents a circumferential length of the first intermediate block, $D1 \leq D2/2$.

The aforementioned pneumatic tire is excellent in drainage performance and on-snow performance because the tire has a plurality of the lateral grooves continuously extending in the tire width direction between the central land portion row and each tread end. Further, since openings, interposing a lateral groove therebetween, of the first longitudinal grooves adjacent to each other in the tire circumferential direction are shifted in the tire width direction and openings, interposing a lateral groove therebetween, of the second longitudinal grooves adjacent to each other in the tire circumferential direction are shifted in the tire width direction in the tire, as described above, the tire can form snow columns in the longitudinal grooves in a satisfactory manner when it runs on a snow-covered road and thus exhibit improved on-snow performance, as compared with a tire in which the respective openings interposing a lateral groove therebetween are aligned in the tire circumferential direction. Yet further, since an end, on the one side in the tire circumferential direction, of the second intermediate block is positioned within a predetermined range as described above, timing discrepancy between a release of the first intermediate block from a road surface and a release of the second intermediate block from the road surface is shortened and separate movements of these two blocks are suppressed, whereby the first intermediate block's pulling the second intermediate block is suppressed so that the latter can ensure a satisfactorily large ground contact area when the tire is rotated. Accordingly, the tire can suppress occurrence of partial wear and improve driving performance and braking performance thereof.

In the present disclosure, a "circumferential length of a block" represents a distance in the tire circumferential direction measured from an end on the one side in the tire circumferential direction of the block to an end on the other side in the tire circumferential direction of the block.

DETAILED DESCRIPTION

Our pneumatic tire will be described in detail with reference to the drawings hereinafter.

Figure 1:
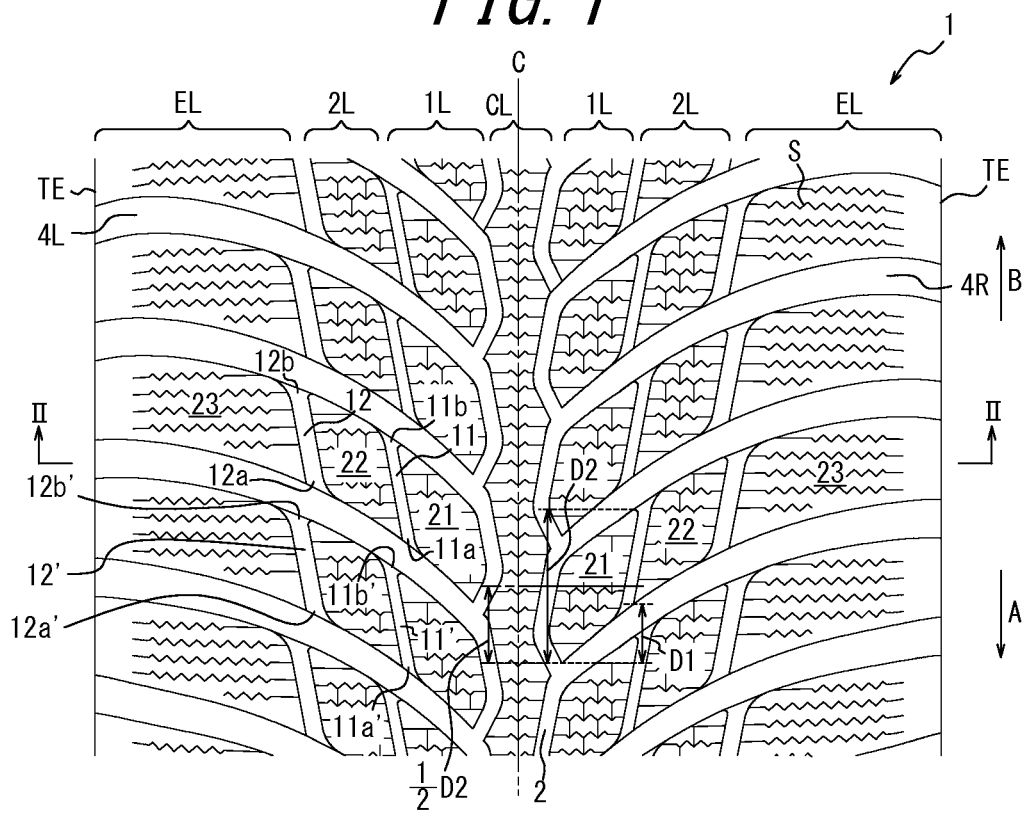
FIG. 1 is a plan view showing a part of a tread of one example of our pneumatic tire.

The pneumatic tire 1 according to one example of our pneumatic tire has in a tread surface thereof a pair of circumferential grooves 2 formed on respective sides of the tire equatorial plane C in the middle, a rib-like central land portion row CL demarcated by the pair of the circumferential grooves 2, and a plurality of lateral grooves 4 continuously extending in the tire width direction between the rib-like central land portion row CL and each tread end TE, as shown in FIG. 1.

Further, a pair of first intermediate land portion rows 1L, each constituted of first intermediate blocks 21 demarcated by the lateral grooves 4, the corresponding circumferential groove 2, and first longitudinal grooves 11 each situated on the outer side in the tire width direction than the circumferential groove 2 and extending in the tire circumferential direction between the corresponding lateral grooves 4 adjacent to each other in the tire circumferential direction, are provided on the outer side in the tire width direction of the central land portion row CL. Yet further, a pair of second intermediate land portion rows 2L, each constituted of second intermediate blocks 22 demarcated by the lateral grooves 4, the first longitudinal grooves 11, and second longitudinal grooves 12 each situated on the outer side in the tire width direction than the first longitudinal grooves 11 and extending in the tire circumferential direction between the corresponding lateral grooves 4 adjacent to each other in the tire circumferential direction, are provided on the outer side in the tire width direction of the first intermediate land portion rows 1L. Yet further, an outer land portion row EL constituted of outer blocks 23 demarcated by the lateral grooves 4, the second longitudinal grooves 12, and the corresponding tread end TE is provided on the outer side in the tire width direction of each second intermediate land portion row 2L.

A plurality of sipes S are formed in the central land portion row CL, the first intermediate blocks 21, the second intermediate blocks 22, and the outer side blocks 23. Configurations of the sipes are not particularly restricted and the sipes S may be either what is called 3D sipes or 2D sipes, for example. The extending direction of each sipe S is not particularly restricted, either. The plurality of sipes S may be formed in the central land portion row CL, the first intermediate blocks 21, the second intermediate blocks 22, and the outer blocks 23 such that the sipes S extend in the tire width direction to increase edge components in the tire width direction, as shown in FIG. 1; or the plurality of sipes S may be formed in the central land portion row CL, the first intermediate blocks 21, the second intermediate blocks 22, and the outer blocks 23 such that the sipes S extend in the tire circumferential direction to increase edge components in the tire circumferential direction, in order to enhance a scratching effect in a desired direction on a snow-covered road and thus on-snow performance of the tire.

The pneumatic tire 1 is a directional tire in which the rotation direction thereof is specified. Specifically, the tire, in use, is mounted on a vehicle such that the tire is rotated in the direction indicated by "A" in FIG. 1 when the tire is rotated in the normal direction, i.e. when the vehicle goes forward.

Each lateral groove 4 extends to be inclined with respect to the tire width direction, as shown in FIG. 1. Specifically, in a plan view each lateral groove 4 extends in a curved manner to protrude toward "the other side B" in the tire circumferential direction such that an inclination angle of the lateral groove 4 with respect to the tire width direction decreases toward the tread end. The lateral grooves 4L situated on one side in the tire width direction of the tire equatorial plane C (the left hand side in FIG. 1) are disposed in parallel to each other in the tire circumferential direction with a constant disposition pitch therebetween, and the lateral grooves 4R situated on the other side in the tire width direction of the tire equatorial plane C (the right hand side in FIG. 1) are disposed in parallel to each other in the tire circumferential direction with a constant disposition pitch therebetween. The lateral grooves 4L on the one side in the tire width direction are disposed such that the positions thereof are shifted by half a pitch in the tire circumferential direction with respect to the positions of the lateral grooves 4R on the other side in the tire width direction. Each lateral groove 4 increases a groove width thereof toward the corresponding tread end.

The pair of the circumferential grooves 2 each extend in the tire circumferential direction to bend with amplitudes in the tire width direction. Specifically, each circumferential groove 2 extends in a zigzag manner such that it has in a plan view a bent portion protruding toward the inner side in the tire width direction between the respective two lateral grooves 4 adjacent to each other in the tire circumferential direction, as shown in FIG. 1.

Each first longitudinal groove 11 extends to be inclined, with respect to the tire circumferential direction, toward the corresponding tread end. An opening 11a, on "one side A" in the tire circumferential direction, of one first longitudinal groove 11 is shifted in the tire width direction from an opening 11b', on the other side B in the tire circumferential direction, of another first longitudinal groove 11' situated on the one side A in the tire circumferential direction of the one first longitudinal groove 11.

Each second longitudinal groove 12 extends to be inclined, with respect to the tire circumferential direction, toward the corresponding tread end and substantially in parallel to the first longitudinal grooves 11. An opening 12a, on the one side A in the tire circumferential direction, of one second longitudinal groove 12 is shifted in the tire width direction from an opening 12b', on the other side B in the tire circumferential direction, of another second longitudinal groove 12' situated on the one side A in the tire circumferential direction of the one second longitudinal groove 12.

More specifically, the opening 11a, on the one side A in the tire circumferential direction, of one first longitudinal groove 11 is not located on the same tire circumferential line as the opening 11b', on the other side B in the tire circumferential direction, of another first longitudinal groove 11' situated on the one side A in the tire circumferential direction of the one first longitudinal groove 11. Similarly, the opening 12a, on the one side A in the tire circumferential direction, of one second longitudinal groove 12 is not located on the same tire circumferential line as the opening 12b', on the other side B in the tire circumferential direction, of another second longitudinal groove 12' situated on the one side A in the tire circumferential direction of the one second longitudinal groove 12. In this connection, the opening 11a, on the one side A in the tire circumferential direction, of the one first longitudinal groove 11 and the opening 11a', on the one side A in the tire circumferential direction, of the another first longitudinal groove 11' are located on the same tire circumferential line; and the opening 11b, on the other side B in the tire circumferential direction, of the one first longitudinal groove 11 and the opening 11b', on the other side B in the tire circumferential direction, of the another first longitudinal groove 11' are located on the same tire circumferential line. Similarly, regarding the one second longitudinal groove 12 and the another second longitudinal groove 12', the openings 12a and 12a' on the one side A in the tire circumferential direction thereof are located on the same tire circumferential line; and the openings 12b and 12b' on the other side B in the tire circumferential direction thereof are located on the same tire circumferential line.

Figure 2:
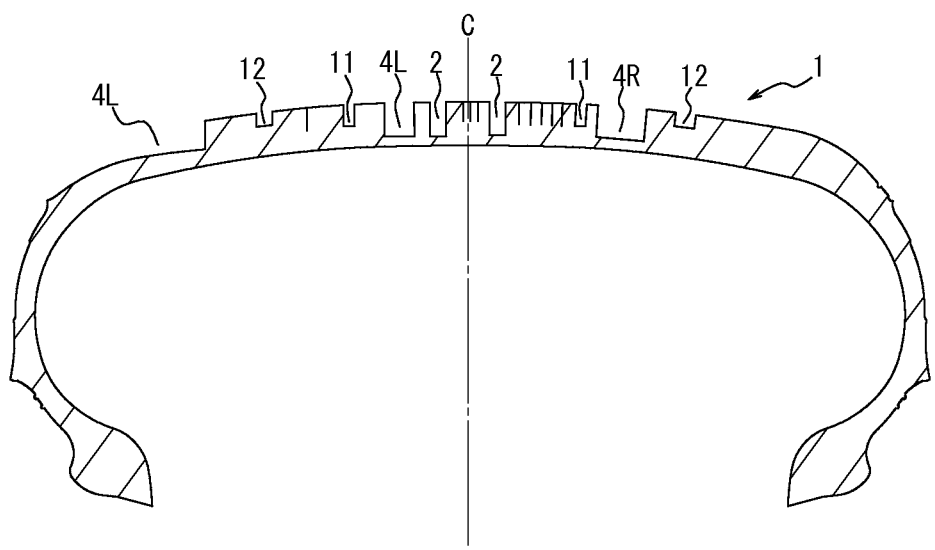
FIG. 2 is a cross sectional view in the tire width direction of the pneumatic tire of FIG. 1 cut along line II-II of FIG. 1.

Groove depths of the first longitudinal grooves 11 and the second longitudinal grooves 12 are smaller than groove depths of the lateral grooves 4 and the circumferential grooves 2, as shown in FIG. 2, i.e. a cross sectional view in the tire width direction of the pneumatic tire 1 cut along line II-II of FIG. 1. Regarding the groove depths of the second longitudinal grooves 12, the first longitudinal grooves 11 and the circumferential grooves 2, the grooves situated on the further inner side in the tire width direction is the deeper, i.e. the groove depth increases in the order of the second longitudinal grooves 12, the first longitudinal grooves 11 and the circumferential grooves 2. Regarding the groove widths of the first longitudinal grooves 11 and the second longitudinal grooves 12, the grooves situated on the further outer side in the tire width direction is the wider, i.e. the groove width increases in the order of the first longitudinal grooves 11 and the second longitudinal grooves 12.

Further, in the pneumatic tire 1, provided that D1 represents a distance in the tire circumferential direction measured from an end, on the one side A in the tire circumferential direction, of each first intermediate block 21 to an end, on the one side A in the tire circumferential direction, of the second intermediate block 22 adjacent to the first intermediate block 21 on the outer side in the tire width direction of the first intermediate block 21 and D2 represents a circumferential length of the first intermediate block, D1≤D2/2, as shown in FIG. 1.

The first intermediate blocks 21, the second intermediate blocks 22 and the outer blocks 23 each have a parallelogram-like configuration in a plan view, as shown in FIG. 1. Regarding dimensions in the tire width direction of the first intermediate blocks 21, the second intermediate blocks 22 and the outer blocks 23, the blocks situated on the further outer side in the tire width direction have the larger dimensions in the tire width direction, i.e. the block dimension in the tire width direction increases in the order of the first intermediate blocks 21, the second intermediate blocks 22, and the outer blocks 23. Regarding dimensions in the tire circumferential direction of the first intermediate blocks 21, the second intermediate blocks 22 and the outer blocks 23, the blocks situated on the further outer side in the tire width direction have the smaller dimensions in the tire circumferential direction, i.e. the block dimension in the tire circumferential direction decreases in the order of the first intermediate blocks 21, the second intermediate blocks 22, and the outer blocks 23.

In the present embodiment, a "dimension in the tire width direction of a block" represents a distance in the tire width direction, measured from an end on one side in the tire width direction of the block to an end on the other side in the tire width direction of the block and a "dimension in the tire circumferential direction of a block" represents a distance in the tire circumferential direction, measured from an end on one side in the tire circumferential direction of the block to an end on the other side in the tire circumferential direction of the block.

The pneumatic tire 1 exhibits good performance in controllability and stability on a dry road surface in particular because the tire has the rib-like central land portion row CL in a center region of the tread surface thereof, as described above.

Further, the pneumatic tire 1 exhibits good drainage performance because the tire has the lateral grooves 4 continuously extending in the tire width direction from the central land portion row CL to the tread ends TE and thus can efficiently drain water through the lateral grooves 4 to the tread ends TE when it runs on a wet road surface. Yet further, the pneumatic tire 1 can exhibit good on-snow performance because: edges of the first intermediate blocks 21, the second intermediate blocks 22 and the outer blocks 23 demarcated by the lateral grooves 4 ensure a good scratching effect against a road surface; and snow columns can be formed by the lateral grooves 4 each continuously extending from the central land portion row CL to the tread ends TE.

An inclination angle of each lateral groove 4 with respect to the tire width direction is relatively small on the corresponding tread end side and the lateral groove 4 increases a groove width thereof toward the tread end. Accordingly, the pneumatic tire 1 can form snow columns in relatively wide portions having relatively small inclination angles on the respective tread end sides, of the lateral grooves 4, thereby satisfactorily improving on-snow performance thereof.

Yet further, although a disposition pitch remains constant in the lateral grooves 4L/4R situated in the same half region of the tread surface, the lateral grooves 4L on the one side in the tire width direction of the tire equatorial plane C are disposed such that the positions thereof are shifted in the tire circumferential direction with respect to the positions of the lateral grooves 4R situated on the other side in the tire width direction of the tire equatorial plane C. As a result, it is possible to reduce pattern noise and thus improve noise reduction performance when the tire is rotated, as compared with a case where the positions of the lateral grooves 4L are not shifted with respect to the positions of the lateral grooves 4R.

Yet further, the pair of the circumferential grooves 2 each extend in the tire circumferential direction to bend with amplitudes in the tire width direction in the pneumatic tire 1 of the one example of our pneumatic tire, thereby ensuring edge components both in the tire circumferential direction and the tire width direction in a satisfactory manner and thus further improving on-snow performance of the tire.

Yet further, regarding one first/second longitudinal groove 11/12 and another first/second longitudinal groove 11'/12' adjacent to each other in the tire circumferential direction, the opening 11a/12a on the one side A in the tire circumferential direction of the one first/second longitudinal groove 11/12 is shifted from the opening 11b'/12b' on the other side B in the tire circumferential direction of the another first/second longitudinal groove 11'/12', whereby the one first/second longitudinal groove 11/12 and the another first/second longitudinal groove 11'/12' do not form one straight circumferential groove extending in the tire circumferential direction. As a result, snow is rammed hard and snow columns are formed in one first longitudinal grooves 11 and the second longitudinal grooves 12 in a satisfactory manner when the tire runs on a snow-covered road, so that snow column shearing force and thus on-snow performance of the tire improve. Yet further, edge effects caused by the first intermediate blocks and the second intermediate blocks improve because the first longitudinal groove 11 and the second longitudinal groove 12 are each inclined with respect to the tire circumferential direction.

In the pneumatic tire 1, timing for edge portions of the first intermediate blocks to be released from a road surface differs from timing for edge portions of the second intermediate blocks to be released from the road surface when the tire is rotated. However, in the pneumatic tire 1, provided that D1 represents a distance in the tire circumferential direction measured from an end, on the one side A in the tire circumferential direction, of each first intermediate block 21 to an end, on the one side A in the tire circumferential direction, of the second intermediate block 22 adjacent to the first intermediate block 21 on the outer side in the tire width direction of the first intermediate block 21 and D2 represents a circumferential length of the first intermediate block, D1≤D2/2. Accordingly, timing discrepancy between a release of the first intermediate block from a road surface and a release of the second intermediate block from the road surface is shortened and separate movements of these two blocks are well suppressed when the tire is rotated, whereby the first intermediate block's pulling the second intermediate block is suppressed so that the latter can reliably have a satisfactorily large ground contact area when the tire is rotated. As a result, it is possible to suppress occurrence of partial wear and improve driving performance and braking performance in the tire.

In this connection, it is preferable that D2/6≤D1≤D2/2. Providing the first intermediate blocks 21 and the second intermediate blocks 22 in such a manner allows the first intermediate blocks 21 to be adequately shifted in the tire circumferential direction with respect to the second intermediate blocks 22 and thus the lateral groove 4 demarcating the first intermediate blocks 21 and the second intermediate blocks 22 to extend to be adequately inclined with respect to the tire width direction, thereby facilitating drainage of water through the lateral groove 4 toward shoulder portions and ensuring good drainage properties of the tire. Further, setting D1 to be within the aforementioned range allows: the first intermediate blocks 21 and the second intermediate blocks 22 to be positioned in an adequately inclined manner in a plan view, thereby improving braking performance on a wet road surface of the tire; and the first intermediate block's pulling the second intermediate block to be further suppressed so that the latter can reliably have a satisfactorily large ground contact area to effectively reduce partial wear of the tire.

Further, the first longitudinal grooves 11 and the second longitudinal grooves 12 are shallower than the lateral grooves 4 and the circumferential grooves 2 in the pneumatic tire 1, whereby rigidity in the tire width direction of the first intermediate blocks 21 and the second intermediate blocks 22 can be enhanced. Ensuring rigidity in the tire width direction of the intermediate blocks by making the first longitudinal grooves 11 shallower than the lateral grooves 4 may somewhat facilitate the first intermediate block's pulling the second intermediate block. However, such pulling of the second intermediate block by the first intermediate block can be suppressed in a satisfactory manner by providing the first intermediate blocks 21 and the second intermediate blocks 22 at the predetermined positions described above (i.e. the positions satisfying, provided that D1 represents a distance in the tire circumferential direction measured from an end, on the one side A in the tire circumferential direction, of each first intermediate block 21 to an end, on the one side A in the tire circumferential direction, of the second intermediate block 22 adjacent to the first intermediate block 21 on the outer side in the tire width direction of the first intermediate block 21 and D2 represents a circumferential length of the first intermediate block, D1≤D2/2).

Yet further, dimensions in the tire width direction of the blocks increase in the order of the first intermediate blocks 21, the second intermediate blocks 22, and the outer blocks 23, i.e. the blocks relatively wide in the tire width direction are provided on each shoulder portion side of the tire, whereby lateral rigidity of the tread improves. In this connection, a satisfactorily large ground contact area can be ensured in a turning or steering situation and thus the turning performance of the tire can be further improved because warping of the blocks due to force applied in the lateral direction can be prevented. Yet further, dimensions in the tire circumferential direction of the blocks decrease in the order of the first intermediate blocks 21, the second intermediate blocks 22, and the outer blocks 23, whereby the blocks on the outer side in the tire width direction, subjected to large force input in a braking situation, can well follow a road surface to ensure a satisfactorily large ground contact area.

Dimensions in the tire width direction of the grooves increase in the order of the first longitudinal grooves 11 and the second longitudinal grooves 12 in the present embodiment, whereby the blocks situated on the outer side in the tire width direction collapse in an adequate manner to allow edges thereof to attain a good scratching effect against a road surface and thus further improve the turning performance of the tire in a turning situation in particular where portions on the outer side in the tire width direction of the tire are subjected to relatively large ground contact pressure.

Further, groove depths of the second longitudinal grooves 12, the first longitudinal grooves 11, and the circumferential grooves 2 increase in the order of the second longitudinal grooves 12, the first longitudinal grooves 11, and the circumferential grooves 2, whereby satisfactorily high rigidity can be ensured in the shoulder portions, subjected to large input force at a braking situation, of the tire. In this connection, water flow from each circumferential groove 2 through the lateral grooves 4 toward the tire shoulder side is not disturbed by the first and second longitudinal grooves 11, 12 and deterioration of drainage properties due to the longitudinal grooves can be safely prevented in this regard because the first and second longitudinal grooves 11, 12 are shallower than the circumferential groove 2.

The foregoing descriptions of the one example of our pneumatic tire with reference to the drawings do not restrict by any means our pneumatic tire, and any change may be appropriately made to our pneumatic tire.

EXAMPLES

Examples of our pneumatic tire will be described hereinafter. Our pneumatic tire, however, is not restricted by these Examples by any means.

Example tires and Conventional Example tire as test tires were prepared and on-ice performances thereof were evaluated by FEM calculation.

Specifically, Example 1 tire provided with a tread as shown in FIG. 1 and having D1/D2=½, Example 2 tire provided with a tread as shown in FIG. 1 and having D1/D2=⅙, and Conventional Example tire provided with a tread as shown in FIG. 1 and having D1/D2=⅔ were first prepared. Then, a ground contact area on a virtual road surface was measured for each of the Example tires and the Conventional Example tire by FEM calculations. The results are expressed by index values relative to the result (the ground contact area) of Comparative Example being "100" in Table 1. The larger index value represents the better performance in Table 1.

TABLE 1

|  | Example 1 | Example 2 | Conventional Example |
|---|---|---|---|
| D1/D2 | 1/2 | 1/6 | 2/3 |
| Ground contact area | 105 | 104 | 100 |

REFERENCE SIGNS LIST

1 Pneumatic tire
2 Circumferential groove
4R, 4L Lateral groove
11, 11' First longitudinal groove
12, 12' Second longitudinal groove
11a, 11a', 11b, 11b' Openings of first longitudinal groove
12a, 12a', 12b, 12b' Openings of second longitudinal groove
21 First intermediate block
22 Second intermediate block
23 Outer block
A One side in tire circumferential direction
B The other side in tire circumferential direction
CL Central land portion row
1L First intermediate land portion row
2L Second intermediate land portion row
EL Outer land portion row
S Sipe
C Tire equatorial plane
TE Tread end

The invention claimed is:

1. A pneumatic tire, having in a tread surface thereof a pair of circumferential grooves formed on respective sides of the tire equatorial plane in the middle, a rib-like central land portion row demarcated by the pair of the circumferential grooves, and a plurality of lateral grooves continuously extending in the tire width direction between the central land portion row and each tread end, comprising in each half region of the tread surface:

a first intermediate land portion row constituted of first intermediate blocks demarcated by the lateral grooves, the corresponding circumferential groove, and first longitudinal grooves each situated on the outer side in the tire width direction than the circumferential groove and extending in the tire circumferential direction between the corresponding lateral grooves adjacent to each other in the tire circumferential direction; and a second intermediate land portion row constituted of second intermediate blocks demarcated by the lateral grooves, the first longitudinal grooves, and second longitudinal grooves each situated on the outer side in the tire width direction than the first longitudinal grooves and extending in the tire circumferential direction between the corresponding lateral grooves adjacent to each other in the tire circumferential direction, wherein an opening, on one side in the tire circumferential direction, of one first longitudinal groove is shifted in the tire width direction from an opening, on the other side in the circumferential direction, of another first longitudinal groove situated on the one side in the tire circumferential direction of the one first longitudinal groove, wherein an opening, on one side in the circumferential direction, of one second longitudinal groove is shifted in the tire width direction from an opening, on the other side in the circumferential direction, of another second longitudinal groove situated on the one side in the tire circumferential direction of the one second longitudinal groove, wherein provided that D1 represents a distance in the tire circumferential direction measured from an end, on the one side in the tire circumferential direction, of each first intermediate block to an end, on the one side in the tire circumferential direction, of the second intermediate block adjacent to the first intermediate block on the outer side in the tire width direction of the first intermediate block and D2 represents a circumferential length of the first intermediate block, $D1 \leq D2/2$, wherein each circumferential groove extends in a zigzag manner such that each first intermediate block has in a plan view a portion protruding toward the inner side in the tire width direction between the respective two lateral grooves adjacent to each other in the tire circumferential direction, wherein groove depths increase in the order of the second longitudinal grooves, the first longitudinal grooves and the circumferential grooves, and wherein dimensions in the tire width direction of the grooves increase in the order of the first longitudinal grooves and the second longitudinal grooves.

2. A pneumatic tire, having in a tread surface thereof a pair of circumferential grooves formed on respective sides of the tire equatorial plane in the middle, a rib-like central land portion row demarcated by the pair of the circumferential grooves, and a plurality of lateral grooves continuously extending in the tire width direction between the central land portion row and each tread end, comprising in each half region of the tread surface:

a first intermediate land portion row constituted of first intermediate blocks demarcated by the lateral grooves, the corresponding circumferential groove, and first longitudinal grooves each situated on the outer side in the tire width direction than the circumferential groove and extending in the tire circumferential direction between the corresponding lateral groves adjacent to each other in the tire circumferential direction; and a second intermediate land portion row constituted of second intermediate blocks demarcated by the lateral grooves, the first longitudinal grooves, and second longitudinal grooves each situated on the outer side in the tire width direction than the first longitudinal grooves and extending in the tire circumferential direction between the corresponding lateral grooves adjacent to each other in the tire circumferential direction, wherein an opening, on one side in the tire circumferential direction, of one first longitudinal groove is shifted in the tire width direction from an opening, on the other side in the circumferential direction, of another first longitudinal groove situated on the one side in the tire circumferential direction of the one first longitudinal groove, wherein an opening, on one side in the circumferential direction, of one second longitudinal groove is shifted in the tire width direction from an opening, on the other side in the circumferential direction, of another second longitudinal groove situated on the one side in the tire circumferential direction of the one second longitudinal groove, provided that D1 represents a distance in the tire circumferential direction measured from an end, on the one side in the tire circumferential direction, of each first intermediate block to an end, on the one side in the tire circumferential direction, of the second intermediate block adjacent to the first intermediate block on the outer side in the tire width direction of the first intermediate block and D2 represents a circumferential length of the first intermediate block, D1≤D2/2, each circumferential groove extends in a zigzag manner such that each first intermediate block has in a plan view a portion protruding toward the inner side in the tire width direction between the respective two lateral grooves adjacent to each other in the tire circumferential direction, groove depths increase in the order of the second longitudinal grooves, the first longitudinal grooves and the circumferential grooves, and wherein a block dimension in the tire circumferential direction decreases in the order of the first intermediate blocks and the second intermediate blocks.

3. A pneumatic tire, having in a tread surface thereof a pair of circumferential grooves formed on respective sides of the tire equatorial plane in the middle, a rib-like central land portion row demarcated by the pair of the circumferential grooves, and a plurality of lateral grooves continuously extending in the tire width direction between the central land portion row and each tread end, comprising in each half region of the tread surface:

a first intermediate land portion row constituted of first intermediate blocks demarcated by the lateral grooves, the corresponding circumferential groove, and first longitudinal grooves each situated on the outer side in the tire width direction than the circumferential groove and extending in the tire circumferential direction between the corresponding lateral grooves adjacent to each other in the tire circumferential direction; and a second intermediate land portion row constituted of second intermediate blocks demarcated by the lateral grooves, the first longitudinal grooves, and second longitudinal grooves each situated on the outer side in the tire width direction than the first longitudinal grooves and extending in the tire circumferential direction between the corresponding lateral grooves adjacent to each other in the tire circumferential direction, wherein an opening, on one side in the tire circumferential direction, of one first longitudinal groove is shifted in the tire width direction from an opening, on the other side in the circumferential direction, of another first longitudinal groove situated on the one side in the tire circumferential direction of the one first longitudinal groove, wherein an opening, on one side in the circumferential direction, of one second longitudinal groove is shifted in the tire width direction from an opening, on the other side in the circumferential direction, of another second longitudinal groove situated on the one side in the tire circumferential direction of the one second longitudinal groove, wherein provided that D1 represents a distance in the tire circumferential direction measured from an end, on the one side in the tire circumferential direction, of each first intermediate block to an end, on the one side in the tire circumferential direction, of the second intermediate block adjacent to the first intermediate block on the outer side in the tire width direction of the first intermediate block and D2 represents a circumferential length of the first intermediate block, D1≤D2/2, wherein each circumferential groove extends in a zigzag manner such that each first intermediate block has in a plan view a portion protruding toward the inner side in the tire width direction between the respective two lateral grooves adjacent to each other in the tire circumferential direction, wherein groove depths increase in the order of the second longitudinal grooves, the first longitudinal grooves and the circumferential grooves, wherein the pneumatic tire further comprises in each half region of the tread surface an outer land portion row constituted of outer blocks demarcated by the lateral grooves, the second longitudinal grooves, and the corresponding tread end, wherein dimensions in the tire width direction of the blocks increase in the order of the first intermediate blocks, the second intermediate blocks, and the outer blocks, and wherein dimensions in the tire circumferential direction of the blocks decrease in the order of the first intermediate blocks, the second intermediate blocks, and the outer blocks.

4. The pneumatic tire of claim 3, wherein the first longitudinal grooves are shallower than the lateral grooves.

5. The pneumatic tire of claim 3, wherein a disposition pitch remains constant in the lateral grooves situated in the same half region of the tread surface, and the lateral grooves on the one side in the tire width direction of the tire equatorial plane are disposed such that the positions thereof are shifted in the tire circumferential direction with respect to the positions of the lateral grooves situated on the other side in the tire width direction of the tire equatorial plane.

6. The pneumatic tire of claim 3, wherein the lateral groove has the largest groove width among the grooves in the tread surface.

7. The pneumatic tire of claim 3, wherein each of the first longitudinal grooves and the second longitudinal grooves has the largest width at a position thereof opening to the corresponding lateral groove.

* * * * *